United States Patent
Yoshinobu et al.

(10) Patent No.: US 11,458,392 B2
(45) Date of Patent: Oct. 4, 2022

(54) GAME APPARATUS, COMPUTER-READABLE NON-TRANSITORY STORAGE MEDIUM HAVING INFORMATION PROCESSING PROGRAM STORED THEREIN, AND INFORMATION PROCESSING METHOD

(71) Applicant: Nintendo Co., Ltd., Kyoto (JP)

(72) Inventors: Tomoaki Yoshinobu, Kyoto (JP); Tomohiro Kawase, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 89 days.

(21) Appl. No.: 17/105,913

(22) Filed: Nov. 27, 2020

(65) Prior Publication Data

US 2021/0299559 A1 Sep. 30, 2021

(30) Foreign Application Priority Data

Mar. 27, 2020 (JP) .............................. JP2020-058842

(51) Int. Cl.
*A63F 13/44* (2014.01)
*A63F 13/48* (2014.01)
*A63F 13/49* (2014.01)

(52) U.S. Cl.
CPC .............. *A63F 13/48* (2014.09); *A63F 13/44* (2014.09); *A63F 13/49* (2014.09)

(58) Field of Classification Search
CPC .......... A63F 13/44; A63F 13/45; A63F 13/48; A63F 13/49; A63F 13/493; A63F 13/533; A63F 13/70; A63F 13/88; A63F 2300/63; A63F 2300/636
See application file for complete search history.

(56) References Cited

U.S. PATENT DOCUMENTS

| | | | |
|---|---|---|---|
| 2012/0309533 A1* | 12/2012 | Horita | A63F 13/48 463/36 |
| 2017/0312626 A1* | 11/2017 | Colenbrander | H04L 67/141 |
| 2020/0034023 A1 | 1/2020 | Sakaino et al. | |
| 2020/0086217 A1* | 3/2020 | Trombetta | A63F 13/497 |
| 2021/0126984 A1* | 4/2021 | Parekh | A63F 13/355 |

FOREIGN PATENT DOCUMENTS

JP 2020-17232 1/2020

* cited by examiner

*Primary Examiner* — Omkar A Deodhar
(74) *Attorney, Agent, or Firm* — Nixon & Vanderhye, PC

(57) ABSTRACT

In a game apparatus in which game programs for a plurality of games each including a title scene and a play scene are stored in a storage medium, a game to be executed is switched in a predetermined order by a user operating a first input device. At a time of the switching, in the case where a currently executed game is in the play scene, the game is interrupted and switching is performed to another game, and, when the game is executed again later, the game is restarted from the time of the interruption of the play scene, and a first image showing the game is displayed on a display. Meanwhile, in the case where the currently executed game is in the title scene, switching is performed to another game, and then when the game is executed again, the game is restarted from the title scene without displaying the first image.

16 Claims, 11 Drawing Sheets

GAME APPARATUS, COMPUTER-READABLE NON-TRANSITORY STORAGE MEDIUM HAVING INFORMATION PROCESSING PROGRAM STORED THEREIN, AND INFORMATION PROCESSING METHOD

CROSS REFERENCE TO RELATED APPLICATION

This application claims priority to Japanese Patent Application No. 2020-058842 filed on Mar. 27, 2020, the entire contents of which are incorporated herein by reference.

FIELD

The exemplary embodiments relate to a game apparatus, a computer-readable non-transitory storage medium having an information processing program stored therein, and an information processing method.

BACKGROUND AND SUMMARY

Hitherto, an information processing apparatus in which a plurality of game applications can be installed has been known. With this apparatus, it is possible for a user to select a game to be played and play the game.

With the above information processing apparatus, the user selects a game to be played from a menu in which a plurality of games are displayed in a list, and thus no particular consideration is given to the case where a game to be played is not selected from such a menu but sequentially switched by a predetermined operation. In addition, in the case of such sequential switching, there is a possibility that it is difficult for the user to instantly grasp which game the switching has been performed to.

Therefore, it is an object of the exemplary embodiments to provide a game apparatus, etc., in which, when switching is performed between a plurality of games to be played and a transition is made to a game screen during playing, it is easy for a user to grasp which game the switching has been performed to.

In order to attain the object described above, for example, the following configuration examples are exemplified.

A configuration example is directed to a game apparatus including a storage medium, a computer, a display, and a first input device. Game programs for a plurality of games each including at least a title scene in which a title screen is displayed and a play scene in which a play screen is displayed are stored in the storage medium. The computer is configured to execute game processing based on the game programs. A game screen related to the currently executed game processing is displayed on the display. The first input device is configured to be operated by a user to thereby switch game processing to be executed among the plurality of games in a predetermined order.

When switching the currently executed game processing in accordance with an operation on the first input device, (1) in the case where the currently executed game processing is in the play scene, the computer is configured to interrupt the game processing and performs switching to other game processing, and, when the game processing is executed again through a further operation on the first input device, the computer is configured to execute the game processing such that the game processing is restarted from the time of interruption of the play scene, and display a first image showing what game processing is being executed, on the display until a predetermined condition is satisfied, and (2) in the case where the currently executed game processing is in the title scene, the computer is configured to perform switching to other game processing, and then when the game processing is executed again through a further operation on the first input device, the computer is configured to execute the game processing such that the game processing is restarted from the title scene without displaying the first image on the display.

According to the above configuration example, the user is allowed to switch a game to be played, by a simple operation that is an operation on the first input device. At the time of switching, if a game to which the switching is performed is in a state during play, there is a possibility that the user cannot grasp which game the switching has been performed to, depending on the scene of the game, and cannot smoothly return to the game. In such a case, displaying an image of a game title or the like as the first image can help the user return to the game. Meanwhile, as for the game to which switching is performed, if the game is not being played, and the title screen is displayed, the user can easily grasp which game the switching has been performed to, and thus the first image is not displayed, thereby improving the visibility of the title screen. That is, if a specific portion of the title screen is hidden by the first image, the portion may become invisible to the user, but this can be prevented. Furthermore, by not displaying the first image, effective use of the screen space can also be made as compared to the configuration in which the first image is displayed at a portion that does not overlap the display region of the title screen.

In another configuration example, the number of the game programs stored in the storage medium may be three.

According to the above configuration example, the user can easily recognize the game to which the switching is performed, so that the usability can be improved. For example, in the case where the number of games to be switched is only two, since the game to which switching has been performed is the game that is not a currently played game, the user can relatively easily grasp which game the switching has been performed to. However, in the case where the number of games to be switched is three, it is easy to get confused about which game switching has been performed to. In this respect, with the configuration of the present application, the user can be allowed to easily recognize the game to which switching is performed. In the case where the number of games to be switched is three, a configuration in which a menu is opened and a game to be played is caused to be selected is also conceivable, but, with this configuration, three operations of "open a menu", "move a cursor or the like to a game to be played", and "determine" are required. In this respect, with the above configuration using the first input device, the number of times of operations can be reduced, so that the convenience of the user can be enhanced.

In another configuration example, a non-game application program may be further stored in the storage medium. Furthermore, the game apparatus may further include a second input device configured to be operated by the user to thereby switch between execution of the game processing and execution of non-game application processing based on the non-game application program. When switching is performed from execution of the non-game application processing to execution of the game processing in accordance with an operation on the second input device, the computer may be configured to perform switching to execution of the game processing executed immediately before switching to the non-game application processing.

According to the above configuration example, for example, when the user temporarily switches to the non-game application program during play of a certain game and then desires to return to the play of the game, the user is allowed to return to the game played immediately before, by a simple operation, so that the convenience of the user can be enhanced.

In another configuration example, at least two of the plurality of game programs stored in the storage medium may be game programs for games in which player characters that are substantially the same are operated.

According to the above configuration example, in the case where two of the games are games in which player characters that are substantially the same, for example, player characters that look almost the same, are operated, there is a possibility that, immediately after switching, the user cannot instantly grasp which game the switching has been performed to, and thus gets confused. However, with the above configuration, such confusion can be prevented or reduced, so that the usability can be improved.

In another configuration example, when switching the currently executed game processing in accordance with an operation on the first input device, the computer may be configured to display a second image showing which turn in the predetermined order the game processing, to which switching is performed, corresponds to, regardless of whether the currently executed game processing is in the play scene.

According to the above configuration example, the user can be allowed to grasp which turn in the order of switching the game to which switching is to be performed is located at. Therefore, when the first input device is further operated one more time, the user can be allowed to easily grasp which game switching is to be next performed to.

In another configuration example, a display area of the second image may be smaller than that of the first image.

According to the above configuration example, as a result of a switching operation, when a return has been made to a game that is during play, both the first image and the second image are displayed, and, in the game screen during play, it can be said that it is important to quickly grasp which game the current game is. Therefore, by displaying the first image such that the first image is larger than the second image, the usability can be improved while effective use of the screen space is made.

In another configuration example, when restating the game processing interrupted in the play scene, the computer may be configured to restart the game processing in a state where progress of the game is paused.

According to the above configuration example, when the game is switched, play of the game is not immediately started, and the user can be ready to restart the play, so that the usability can be improved.

In another configuration example, when a predetermined time elapses after display of the first image is started, or when a predetermined operation is performed by the user even before the predetermined time elapses, the computer may be configured to delete the first image.

According to the above configuration example, a reduction in visibility due to the first image being continuously displayed can be prevented. Particularly, when the game is restarted in a state where the game is paused, and this paused state is cancelled, play of the game is restarted. Therefore, in such a case, the usability can be improved by deleting the display of the first image even before the predetermined time elapses.

In another configuration example, when switching the currently executed game processing in accordance with an operation on the first input device, the computer may be configured to perform display such that a currently displayed game image is blacked out, for a predetermined time, and then start displaying a game image of a game to which switching is to be performed, and, when displaying the first image, the computer may be configured to display the first image while the game image is displayed so as to be blacked out.

According to the above configuration example, the user can be allowed to easily recognize that the game has been switched. In addition, since the first image is displayed even while the blacked-out screen is displayed, the user can be allowed to easily grasp which game the switching is to be performed to.

According to the exemplary embodiments, it is possible to provide a game apparatus, etc., which can switch between a plurality of games by a simple operation and in which, at the time of switching, it is easy to grasp which game the switching is to be performed to.

DETAILED DESCRIPTION OF NON-LIMITING EXAMPLE EMBODIMENTS

[Hardware Configuration of Information Processing Apparatus]

Hereinafter, one exemplary embodiment will be described. First, the hardware configuration of an information processing apparatus assumed in the exemplary embodiment will be described. In the exemplary embodiment, a description will be given with a hand-held game apparatus (hereinafter, referred to simply as a game apparatus) as an example of the information processing apparatus. In the game apparatus according to the exemplary embodiment, three game applications (hereinafter, referred to simply as games) are pre-installed, and it is possible to switch a game to be executed, by a predetermined operation, and play the game. In addition to these games, a clock application is also installed. For example, when a user is not playing any game, the game apparatus can also be used as a clock by executing the clock application.

Figure 1:
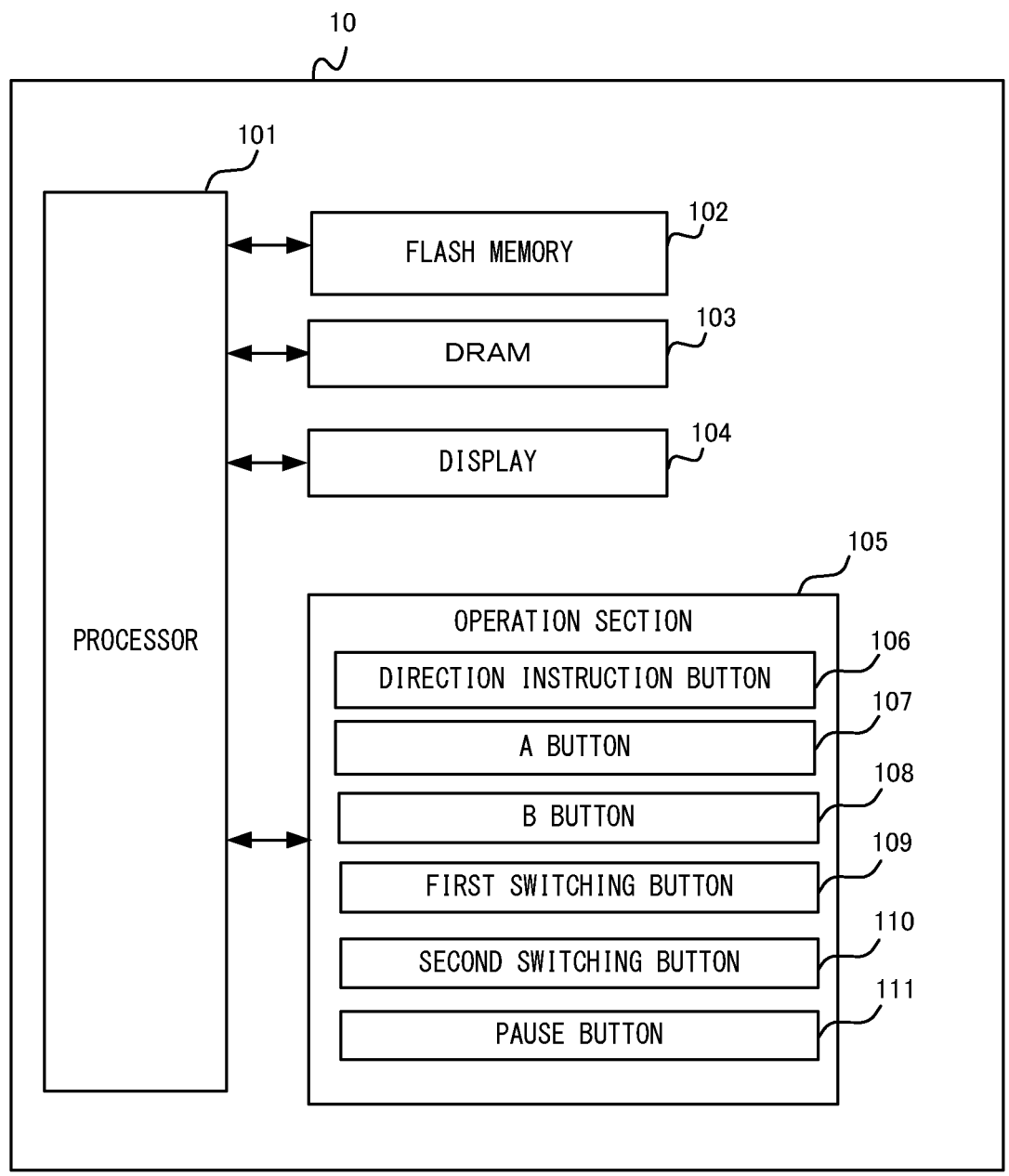
FIG. 1 is a block diagram showing a non-limiting example of the hardware configuration of an information processing apparatus 10.

FIG. 1 is a block diagram showing the hardware configuration of the game apparatus 10 according to the exemplary embodiment. In FIG. 1, the game apparatus 10 includes a processor 101, a flash memory 102, a DRAM 103, a display 104, and an operation section 105. Although not shown, the game apparatus 10 also includes an RTC and a battery. The game apparatus 10 is a portable game machine having a size that allows the game machine to be held by both hands or one hand.

The processor 101 executes various kinds of processing as described later. The processor 101 may include a single processor or a plurality of processors. In the flash memory 102, various programs to be executed by the processor 101 and various kinds of data to be used in the programs are stored. The DRAM 103 is a memory for storing game data generated during game processing, as necessary. In this example, when actually executing processing according to the exemplary embodiment, various programs and various kinds of data in the flash memory 102 are copied (loaded) into the DRAM 103. In execution of the processing described below, the program and data copied into the DRAM 103 are basically used. In addition, a part of the area of the DRAM 103 is also used as a VRAM (Video RAM).

Next, the operation section 105 is an input device for accepting an operation from the user. Specifically, the operation section 105 includes at least a direction instruction button 106 (for example, a cross key or the like), an A button 107, a B button 108, a first switching button 109, a second switching button 110, and a PAUSE button 111. In this example, these buttons are press-type buttons. In addition, although not shown, the operation section 105 also includes a reset button, a power button, etc.

The direction instruction button 106 is, for example, a button for inputting each of upward, downward, leftward, and rightward directions. The A button 107 and the B button 108 are used for an operation for determining or cancelling a predetermined item. In addition, in various kinds of game processing described later, predetermined functions are appropriately assigned to the A button 107 and the B button 108. For example, an attack operation, an accelerator operation, a brake operation, etc., are assigned to the A button 107 and the B button 108. The first switching button 109 is a button for switching a game to be executed between the above-described plurality of games. The second switching button 110 is a button for switching to the clock application. When the second switching button 110 is pressed during execution of any one of the games, the processing can be switched to execution of the clock application. The PAUSE button 111 is a button for bringing the currently executed game into a paused state during execution of the game processing, and cancelling the paused state. When the PAUSE button 111 is pressed during play of a game, game processing during play can be brought into a paused state. In addition, when the PAUSE button 111 is pressed again in the paused state, the paused state can be cancelled. In the exemplary embodiment, the paused state can also be cancelled by pressing the A button 107 or the B button 108 as an operation for cancelling the paused state (hereinafter, a pause cancellation operation).

[Outline of Processing According to Exemplary Embodiment]

Next, the outline of processing assumed in the exemplary embodiment will be described. As described above, with the game apparatus 10 according to the exemplary embodiment, it is possible to play the three games. Each time the first switching button 109 is pressed, the game to be executed can be switched in a predetermined order.

Figure 2:
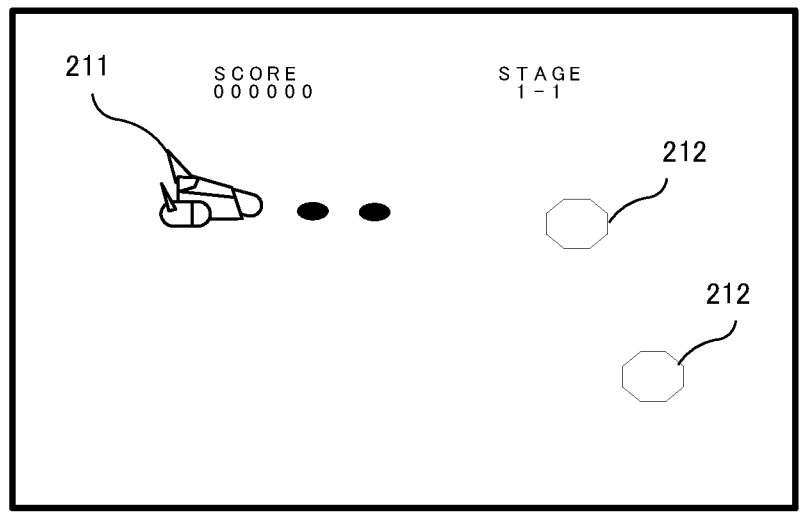
FIG. 2 illustrates a non-limiting example of a screen during play of a first game.

An example of the three games will be briefly described using screen examples. In the exemplary embodiment, first, a horizontal-scrolling shooting game is taken as an example of the first game. FIG. 2 illustrates an example of a screen during play of the first game. In FIG. 2, a player character 211 and enemy characters 212 are displayed. The user is allowed to move the player character 211 by operating the direction instruction button 106 and to make various attacks by using the A button 107 and the B button 108.

Figure 3:
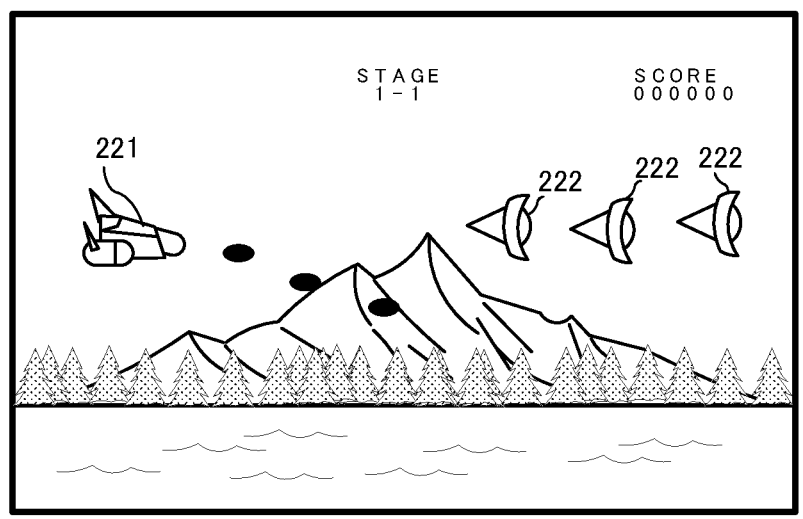
FIG. 3 illustrates a non-limiting example of a screen during play of a second game.

Next, the second game will be described. In the exemplary embodiment, a horizontal-scrolling shooting game similar to the first game is taken as an example of the second game. FIG. 3 illustrates an example of a screen during play of the second game. The second game is the sequel to the first game. In the exemplary embodiment, the first game and second game are a series of games originally created for the same platform. In the second game, a character that is substantially the same as the player character 211 in the first game is used as a player character 221. The "substantially the same" includes, for example, the case where the appearance of the characters is the same, the case where, strictly speaking, the appearance of the characters is slightly different but can be recognized to be almost the same, and the case where the characters can be recognized to be the same (in the series of games). In each of the first game and the second game, when the player character has acquired an item or has been damaged, the appearance of the player character can be changed.

Figure 4:
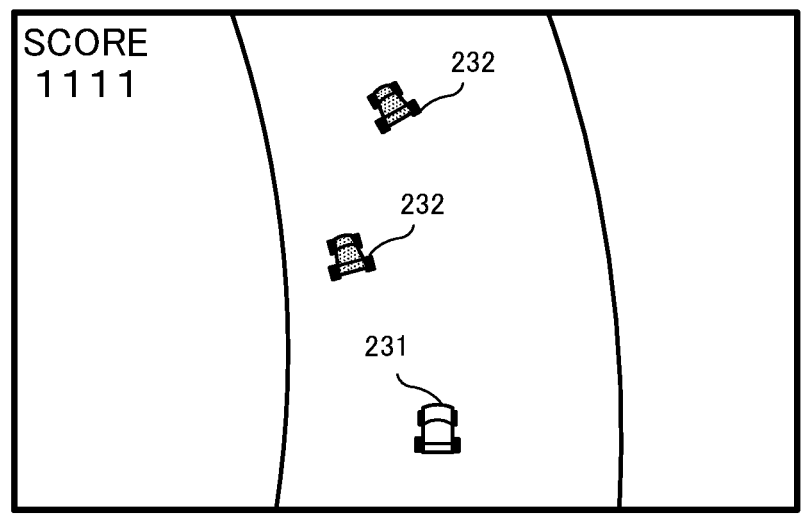
FIG. 4 illustrates a non-limiting example of a screen during play of a third game.

Next, the third game will be described. In the exemplary embodiment, a race game with a looked-down type (bird's eye view) screen configuration is taken as an example of the third game. FIG. 4 illustrates an example of a screen during play of the third game. In this game, a player character 231 is a character that imitates a vehicle. The user performs a handling operation by operating the direction instruction button 106, and performs an accelerator or brake operation by using the A button 107 and the B button 108, to drive the player character 231, and races with enemy characters 232.

Figure 5:
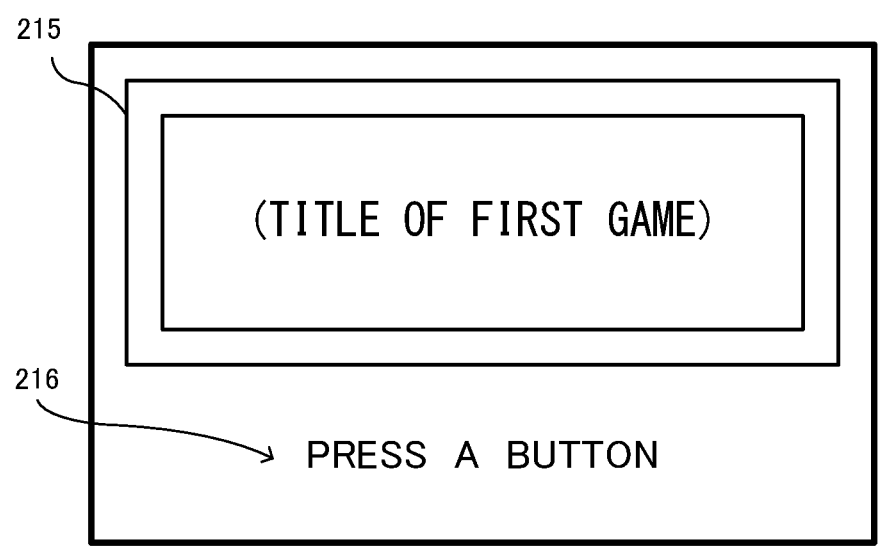
FIG. 5 illustrates a non-limiting example of a title screen of the first game.

When each of the games is started, a "title screen" is displayed. As an example, FIG. 5 illustrates an example of the title screen of the first game. On the title screen, a panel image 215 including at least a game title, and an operation suggestion display 216 are displayed. In addition, on the title screen, a demonstration in which a game character appears and moves around may be performed. Moreover, a demonstration screen in which game stages are introduced may be displayed after the title screen is displayed. In the following description, such a demonstration is referred to as a "title demonstration". In addition, the title screen and the title demonstration are collectively referred to as a "title scene". In the title scene, by the user performing a predetermined operation (game start operation), a transition can be made to a play screen in which a player character is actually operated to advance the game (that is, actual game play can be started). In the following description, a state where such a player character that can be operated is displayed and a game screen on which the game is played by actually operating the player character is displayed, is referred to as a "play scene", and a game screen at this time is referred to as a "play screen". Regarding the play scene and the play screen, in this example, for convenience of description, an example in which a player character is explicitly displayed on the screen will be described. However, the play scene is not limited to this example, and can also include a scene, other than the title scene, in which a player character is not directly displayed. For example, the play scene in this example includes a scene in which a player character is not directly displayed but an object reacting to an operation of the user is displayed in a puzzle game, a simulation game, a character training game, or the like, and scenes, other than the title scene, in which it is possible to advance the game in accordance with an operation of the user. In the following, when "during play" is described, it is assumed that the current scene is the play scene, unless otherwise specified.

Here, a supplemental description of an operation of pausing a game by the PAUSE button 111 will be given. In the exemplary embodiment, it is assumed that, when a pause by the PAUSE button 111 is performed in a predetermined scene, the scene continues to be maintained. For example, when a pause is performed in the play scene, the state of the pause is included in the play scene. Meanwhile, when the PAUSE button 111 is pressed in the middle of the title scene, a paused state may be caused, or the input of the PAUSE button 111 may be ignored. If it is made possible to perform a pause in the title scene, the state of the pause is included in the title scene.

In another exemplary embodiment, "another scene" other than the title scene and the play scene may be set. In the exemplary embodiment, setting a scene other than the title scene and the play scene is not excluded, and whether to display a later-described notification image in such a scene may be set as appropriate.

Figure 6:
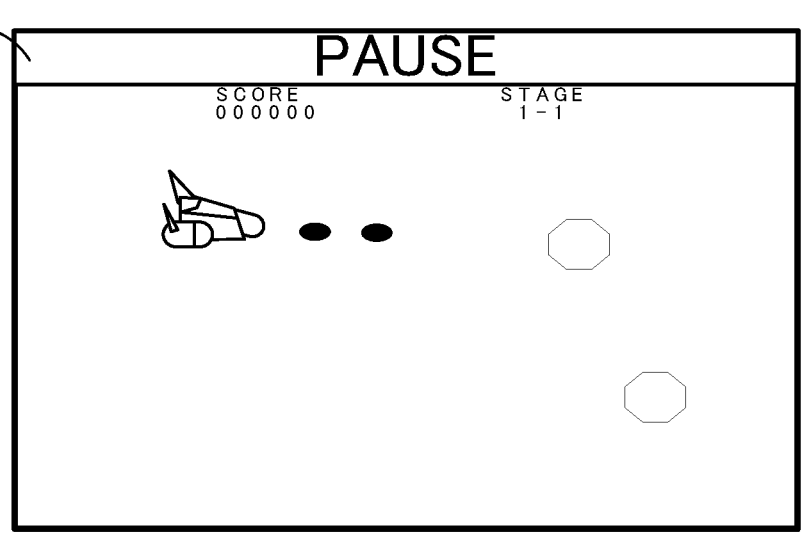
FIG. 6 illustrates a non-limiting example of a screen in a state where the first game is paused.

Here, an example of a screen in the above-described paused state will be described in relation to the above-described operation of the PAUSE button 111. FIG. 6 illustrates an example of a screen in a paused state of the first game. In FIG. 6, a horizontally long bar-shaped image 251 (hereinafter, pause display image) including the characters "PAUSE" is displayed at an upper part of the screen so as to be superimposed in a game image. By the user pressing the PAUSE button 111 in the play scene of the first game, the progress of the game is paused, and such a screen is displayed. By the user performing a pause cancellation operation such as pressing the PAUSE button 111 again, the paused state is cancelled, the pause display image 251 is also deleted from the screen, and game play can be restarted.

FIG. 6 described above shows an example in which a paused state is caused in a state where the game image during play is displayed. However, in another exemplary embodiment, in the paused state, the game image during play is not displayed, and another image may be displayed. In the case of a game such as a time-limited puzzle game in which a puzzle board in a paused state is not desired to be shown to the user due to the nature of the game, only an image corresponding to the pause display image 251 may be displayed.

Here, in the following description, the terms "paused state" and "interruption of game processing" are used differently. Unlike the "interruption of game processing" which is involved in game switching described later, the "paused state" is a state where the game processing itself continues, such as a state where game image output every frame period and acceptance of an operation input itself continue. For example, the "paused state" is a state where the state of the player character can be changed by performing a predetermined input (a so-called hidden command or the like) in the paused state. Meanwhile, the "interruption of game processing" described later means that execution of the game processing is fully stopped once.

As described above, the three different games can be played with the game apparatus 10. By pressing the first switching button 109, switching can be performed between the three games to be displayed on the display 104, in an order that is a loop of first game→second game→third game→first game. When processing of each game is considered as one operation mode, it can also be said that it is possible to switch between three game operation modes.

In the exemplary embodiment, when a switching operation is performed with the first switching button 109, the currently executed game processing is interrupted once (at this stage, this is regardless of whether the current scene is the title scene or the play scene). Then, when a switching operation with the first switching button 109 is further repeated and switching is performed to this game processing, the interrupted processing is restarted. At this time, behavior at the restart is different depending on whether the scene at the timing when the game is interrupted is the title scene or the play scene. As an example, the case of interrupting and restarting the first game will be described. First, when the user presses the first switching button 109 during play (in the play scene) of the first game, the process of the first game is interrupted. At this time, a paused state is caused as described above, and then game processing is interrupted. In other words, it can be said that the game processing in the paused state is interrupted. Thereafter, switching from the second game to the third game occurs, then switching is further performed to the first game again, and the game processing is restarted with the paused state being maintained. Therefore, when the user desires to continue to play the first game, the user needs to perform a pause cancellation operation. In another exemplary embodiment, when interrupting game processing through an operation on the first switching button 109, switching may be instantly performed to the next game without pausing the game processing. Then, when the game is restarted, the game may be restarted from a paused state.

Meanwhile, when the user presses the first switching button 109 while the title screen of the first game is displayed (in the title scene), processing related to the title scene is interrupted once. For example, as movement in the title scene, the case where the title screen shown in FIG. 5 described above is initially displayed for 5 seconds and then a demonstration in which a game character moves around below the panel image 215 is displayed for 10 seconds as a title demonstration, is assumed. That is, the case where title scene processing in which such a series of movements is performed is executed as processing of the title scene, is assumed. In this case, when the user presses the first switching button 109 in the middle of the title demonstration, the game processing (title scene processing) is interrupted once in the middle of the title demonstration. However, when the first game is subsequently restarted, the first game is restarted from the beginning of the title scene, not from the middle of the title demonstration (unlike restart of the play scene, this restart is not restart in a paused state). In another exemplary embodiment, also in this case, the processing may be restarted from the middle of the title demonstration.

In the game apparatus 10, by pressing the second switching button 110 during execution of any one of the games, switching can be performed to the clock application (the content displayed on the display 104 can be changed to a content of the clock application). At this time, the currently executed game processing is interrupted once. At this time, the game processing may be interrupted after the above paused state is caused. In addition, in the exemplary embodiment, when the first switching button 109 is pressed during execution of the clock application, switching can be performed to the game that has been executed before switching to the clock application. For example, when switching is performed to the clock application during execution of the second game and then the first switching button 109 is pressed, the second game is restarted. When the second switching button 110 is pressed during execution of the clock application, the execution of the clock application may be continued particularly without occurrence of a switching process or the like. Alternatively, a return may be made to execution of the game that has been executed before switching to the clock application. That is, processing that is substantially the same as when the first switching button 109 is pressed may be executed.

In the case where the game is switched in a predetermined order as described above, when the game screen is merely switched, it may be difficult for the user to instantly grasp which game the switching has been performed to. Therefore, in the exemplary embodiment, when switching the game, a notification image for showing which game the switching has been performed to is displayed on a part of the screen. Accordingly, when returning to the game play from another game, the user can quickly grasp the game displayed on the screen, and thus can more smoothly return to the game play.

Figure 7:
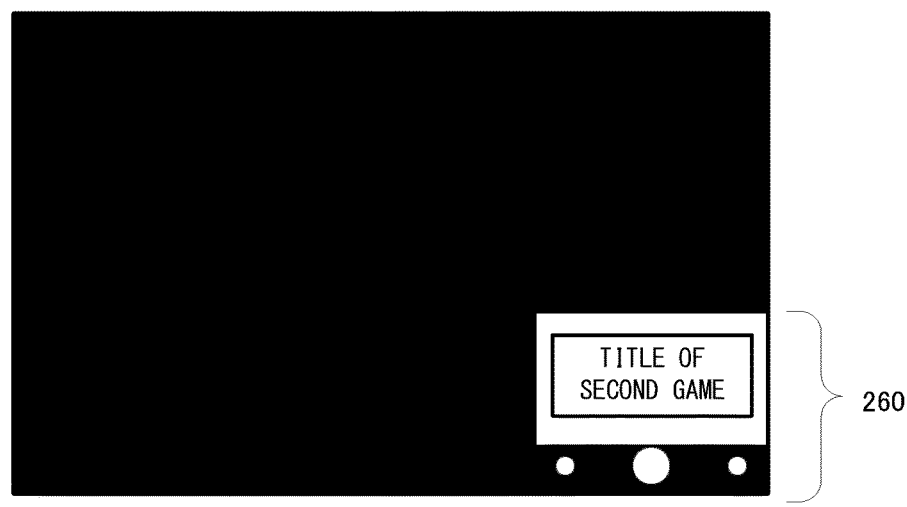
FIG. 7 illustrates a non-limiting example of a screen during switching.

Hereinafter, an example of the above notification image at the time of switching will be described using screen examples. First, the case where the first switching button 109 is pressed while the user is playing the first game (in the play scene; the state of FIG. 2 described above) will be described. In this case, first, as shown in FIG. 7, a representation in which a game image is instantly or gradually darkened (blacked out) and becomes a black game image is displayed. In addition, during a display process related to this darkening, a notification image 260 is displayed in a partial region at the lower right part of the screen so as to be superimposed on the game image. In the exemplary embodiment, this blacked-out image is also treated as one game image. That is, output of the blacked-out image to the screen is treated as output of a game image.

Figure 8:
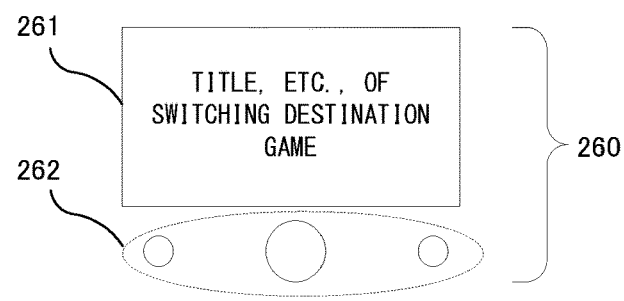
FIG. 8 is a diagram for describing a non-limiting example of a notification screen.

FIG. 8 shows the notification image 260 in an enlarged manner. The notification image 260 includes a switching game notification image 261 and an order notification image 262. In the exemplary embodiment, the switching game notification image 261 is an image obtained by iconizing a title image of the game to which switching is to be performed. As a matter of course, the switching game notification image 261 is an example, and any image in which it is possible for the user to recognize the game, such as an image in which the title is displayed in some form, may be used. In addition, in order to make it easier for the user to grasp which game the switching is to be performed to, the switching game notification image 261 is displayed such that the area thereof is larger than that of the order notification image 262 described later.

The order notification image 262 is located below the switching game notification image 261. The order notification image 262 is an image for showing which of the three games the switching is to be performed to. The occupied area of the order notification image 262 in the screen is smaller than that of the switching game notification image 261. In the exemplary embodiment, circles corresponding to the three games, respectively, are displayed side by side. Specifically, the leftmost circle corresponds to the first game, the middle circle corresponds to the second game, and the rightmost circle corresponds to the third game. By displaying the circle corresponding to the game, to which switching is to be performed, such that this circle is larger than the other circles, it is shown which of the games the switching is to be performed to. In addition, the order notification image 262 is displayed such that the portion other than the circles is transparent. The order notification image 262 is configured such that the visibility thereof is not impaired as much as possible by making the order notification image 262 smaller than the switching game notification image 261 and displaying the order notification image 262 so as to be transparent. In another exemplary embodiment, the respective circles themselves may be treated as the order notification image 262.

Figure 9:
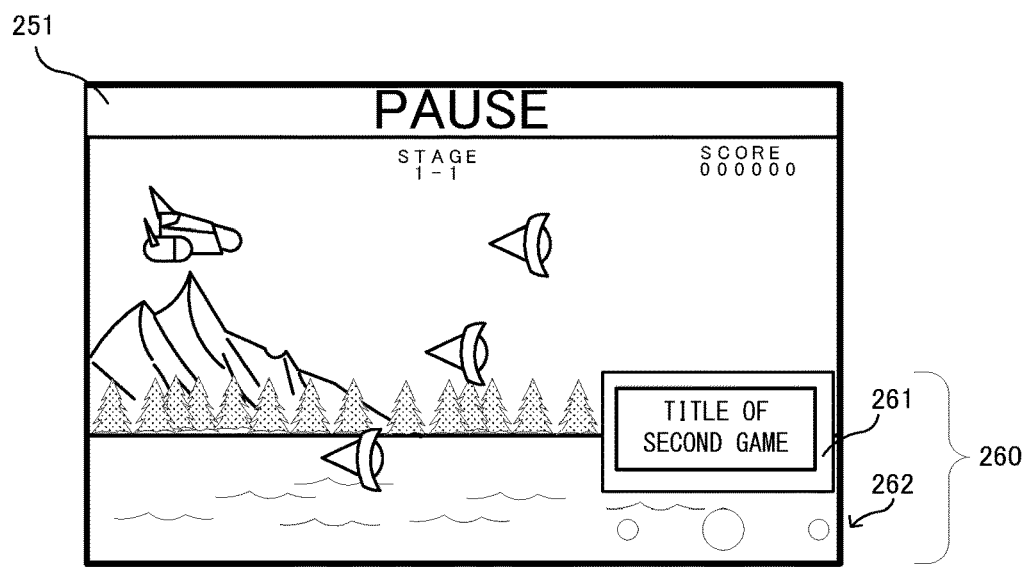
FIG. 9 illustrates a non-limiting example of a screen (play scene) immediately after switching to the second game.

After the representation regarding the blacked-out image as shown in FIG. 7 described above is performed for a predetermined time (for example, about 2 to 3 seconds), a game image of the second game is displayed as shown in FIG. 9. Here, it is assumed that this game image is an image interrupted during play of the second game. In FIG. 9, the pause display image 251 is displayed, and it is shown that the play of the second game is in a paused state. In addition, the notification image 260 is displayed at the lower right part of the screen. The notification image 260 is automatically deleted after being displayed for a predetermined time. For example, the notification image 260 is automatically deleted after an elapse of 5 seconds from the start of display of the notification image 260 in FIG. 7 described above. A concept of the "predetermined time" until the notification image 260 is deleted includes a display time that is set as a time for which the notification image 260 is displayed, and a predetermined time after display of the notification image 260 is substantially started, such as an elapsed time after the above game switching operation is performed and an elapsed time after the game is restarted.

Figure 10:
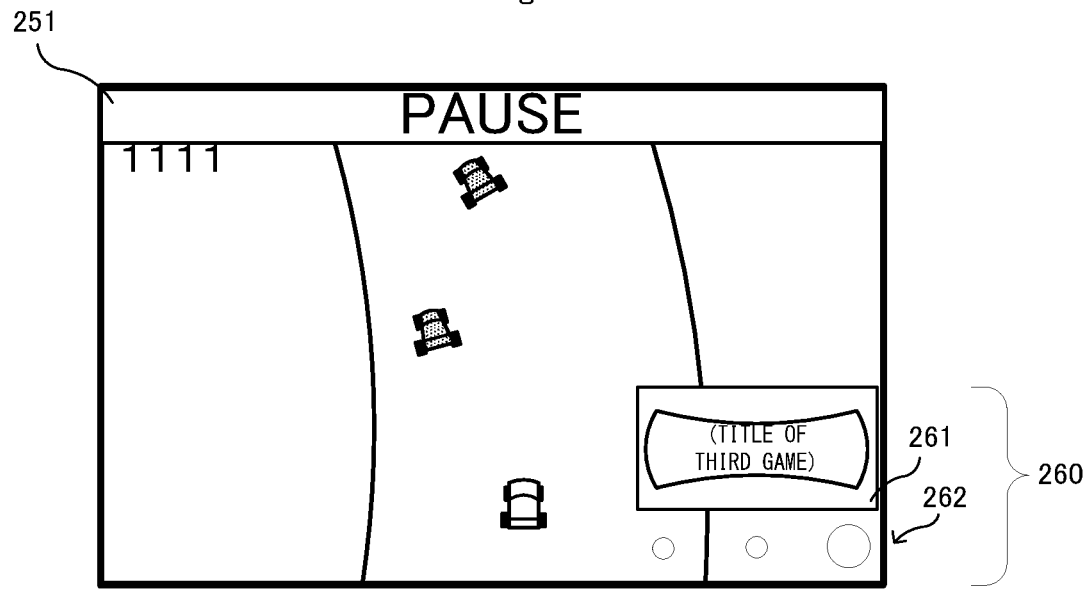
FIG. 10 illustrates a non-limiting example of a screen (play scene) immediately after switching to the third game.

Next, the case where the first switching button 109 is pressed during play of the second game will be described. In this case, a blacked-out screen is displayed as described above, and then a game image of the third game shown in FIG. 10 is displayed. As for the contents of the notification image 260 in this case, first, an image obtained by iconizing the title screen of the third game is displayed in the switching game notification image 261. In addition, an image in which the rightmost circle is larger than the other circles is displayed as the order notification image 262. Accordingly, it is possible for the user to quickly grasp that switching is to be performed to the third game. In the case of FIG. 10 as well, the third game is interrupted during play of the third game. Therefore, the pause display image 251 is also displayed on this screen, so that it is shown that the play of the third game is in a paused state.

Figure 11:
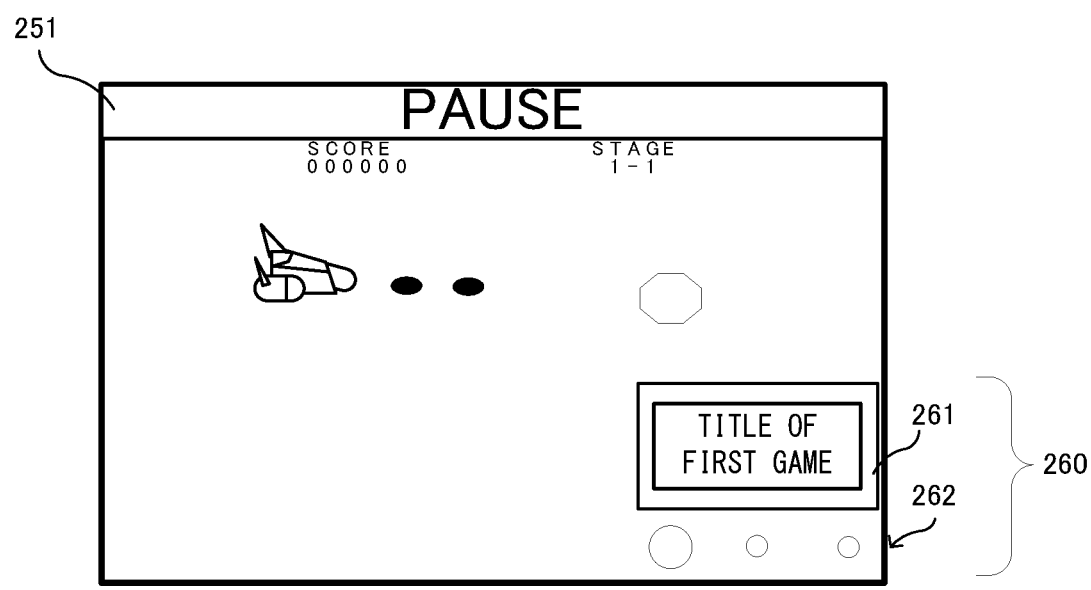
FIG. 11 illustrates a non-limiting example of a screen (play scene) immediately after switching to the first game.

Next, the case where the first switching button 109 is pressed during play of the third game will be described. In this case, a blacked-out screen is displayed as described above, and then a game image of the first game shown in FIG. 11 is displayed. As for the contents of the notification image 260 in this case, an image obtained by reducing the size of the title screen of the first game or iconizing the title screen of the first game is displayed in the switching game notification image 261. In addition, an image in which the leftmost circle is larger than the other circles is displayed as the order notification image 262. Accordingly, it is possible for the user to quickly grasp that switching is to be performed to the first game. In addition, the pause display image 251 is displayed, so that it is shown that play of the first game is in a paused state. The user is allowed to restart the play of the first game by performing a pause cancellation operation in this state.

As for the order notification image 262, the mere white circles are shown in the drawings described above, but a predetermined character or a predetermined image corresponding to each game may be displayed as a content actually displayed in each of the white circles.

Figure 12:
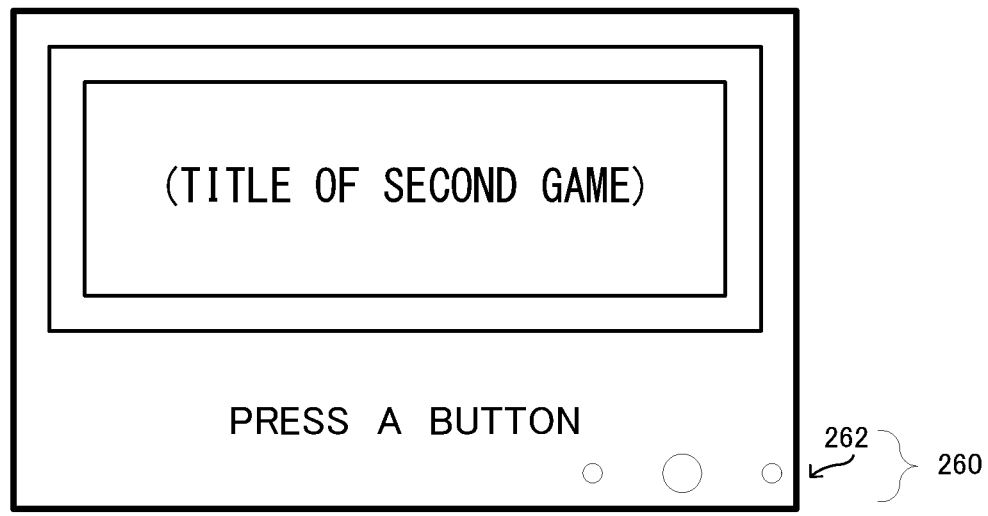
FIG. 12 illustrates a non-limiting example of a screen (title scene) immediately after switching to the second game.
Figure 13:
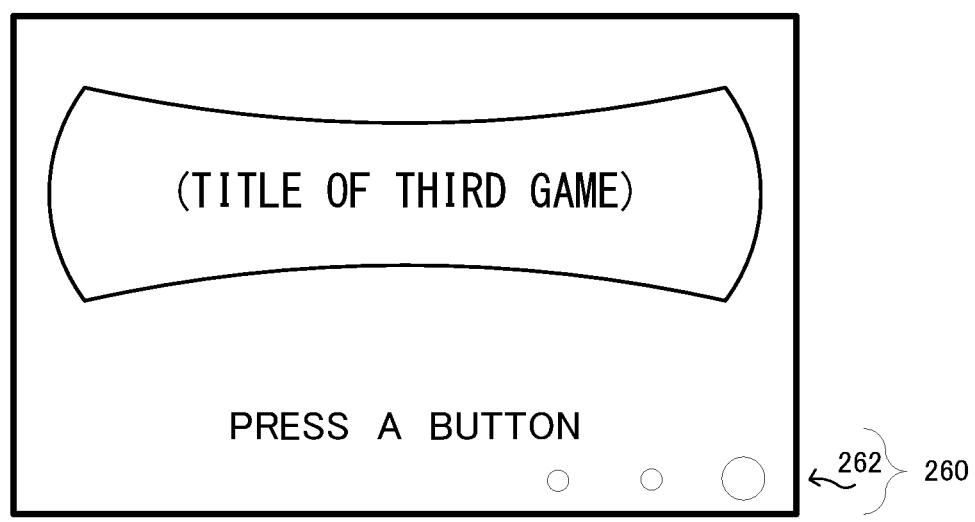
FIG. 13 illustrates a non-limiting example of a screen (title scene) immediately after switching to the third game.

In the exemplary embodiment, the switching game notification image 261 is displayed only when the game to which switching is to be performed has been interrupted in the play scene. That is, when the game is interrupted in the title scene and a return is subsequently made to the game, display of the switching game notification image 261 as described above is not performed. Meanwhile, the order notification image 262 is displayed for a predetermined time at the time of switching regardless of whether the game has been interrupted in the title scene or the play scene. For example, the case where switching is performed from the first game to the second game and the second game has been interrupted in the title scene, is assumed. In this case, when the first switching button 109 is pressed, a blacked-out screen is displayed once as described above, but the switching game notification image 261 is not displayed and only the order notification image 262 is displayed as the notification image 260. As described above, in the exemplary embodiment, even when the game has been interrupted in the middle of the title demonstration, the game is executed from the beginning of the processing of the title scene at the time of restart. Therefore, after the blacked-out screen is displayed, a title screen of the second game shown in FIG. 12 is displayed as an initial process in the title scene regardless of at which timing in the title scene the game is interrupted. Also on this screen, only the order notification image 262 is combined as the notification image 260 with the title screen. The same applies to the cases of the first game and the third game. For example, when the third game interrupted in the title scene is restarted, a screen on which the notification image 260 including only the order notification image 262 is combined with the title screen of the third game is displayed as shown in FIG. 13.

The reason why the switching game notification image 261 is not displayed when switching is performed to the title scene as described above is as follows. When the title screen is displayed after switching, the user can immediately grasp which game the switching is to be performed to, even without especially displaying the switching game notification image 261 including the title of the game. Therefore, this case is intended to improve the visibility of the title screen without displaying the switching game notification image 261. In other words, this case is intended to prevent a reduction in the visibility of the title screen due to a part of the title screen being hidden by the switching game notification image 261 (each time switching is performed). As for this, it is also conceivable that the switching game notification image 261 is displayed at a location at which the switching game notification image 261 is not superimposed on the game image. However, in this case, a screen space for displaying the switching game notification image 261 is required. Therefore, also from the viewpoint of effective use of the screen space, the switching game notification image 261 is not displayed. Meanwhile, by displaying the order notification image 262, it is possible for the user to grasp the order of game switching. Furthermore, when the first switching button 109 is pressed one more time, it is possible to make the user to easily grasp which game switching is to be performed to. In addition, by making the occupied area of the order notification image 262 smaller than that of the switching game notification image 261 and also making the background of the order notification image 262 transparent, a reduction in the visibility of the title screen is prevented as much as possible.

As described above, in the exemplary embodiment, in the game apparatus in which the game can be switched in a predetermined order by a predetermined operation, when the switching operation is performed, the notification image 260 showing which game the switching is to be performed to is displayed as necessary. Accordingly, the user can be allowed to quickly recognize which game switching is to be performed to, which helps the user return to play of the game.

[Details of Game Processing According to Exemplary Embodiment]

Next, processing of the game apparatus 10 according to the exemplary embodiment will be described in more detail with reference to FIG. 14 to FIG. 17.

[Data in Flash Memory]

Figure 14:
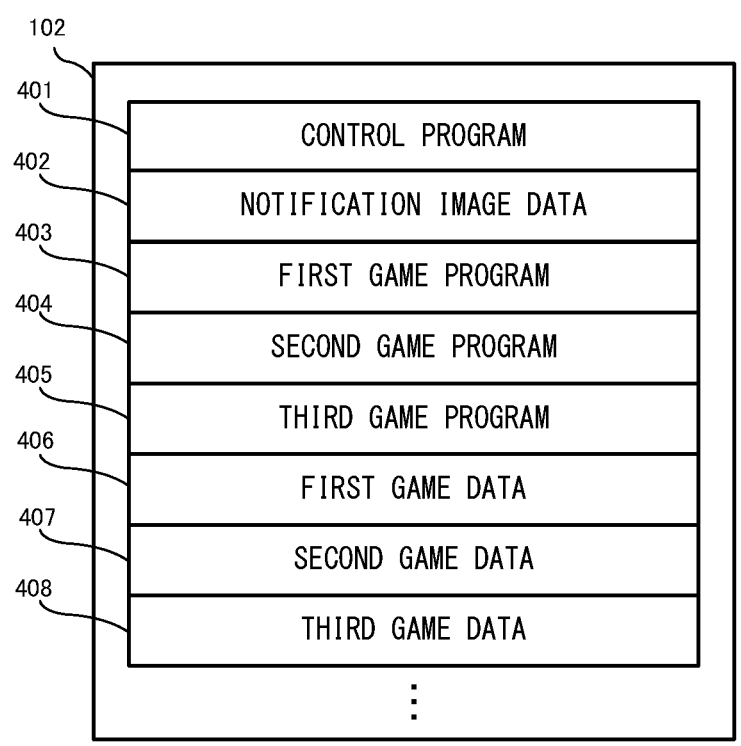
FIG. 14 illustrates a non-limiting example of data stored in a flash memory 102.

First, various kinds of data stored in the flash memory 102 will be described. FIG. 14 illustrates a memory map showing an example of various kinds of data stored in the flash memory 102. In the flash memory 102, a control program 401, notification image data 402, a first game program 403, a second game program 404, a third game program 405, first game data 406, second game data 407, third game data 408, etc., are stored.

The control program 401 is a program for controlling execution of the above-described three games based on the first game program 403, the second game program 404, and the third game program 405 described later, or performing switching of game processing of these games and control for display of the notification image 260.

The notification image data 402 is image data on which the notification image 260 is based. The notification image data 402 includes image data of the switching game notification image 261 corresponding to each of the three games, and image data of the order notification image 262 described above.

The first game program 403 is a game program for executing the first game. The second game program 404 is a game program for executing the second game. The third game program 405 is a game program for executing the third game.

The first game data 406 is various kinds of data to be used in the first game. For example, the first game data 406 includes image data and audio data of various characters, etc. Similarly, the second game data 407 is various kinds of data to be used in the second game. The third game data 408 is various kinds of data to be used in the third game.

[Data in DRAM]

Next, data stored in the DRAM 103 will be described with reference to FIG. 15. In the exemplary embodiment, for example, when the power of the information processing apparatus 10 is turned on, the program and data stored in the flash memory 102 are copied into a predetermined area (address) within the DRAM 103.

Figure 15:
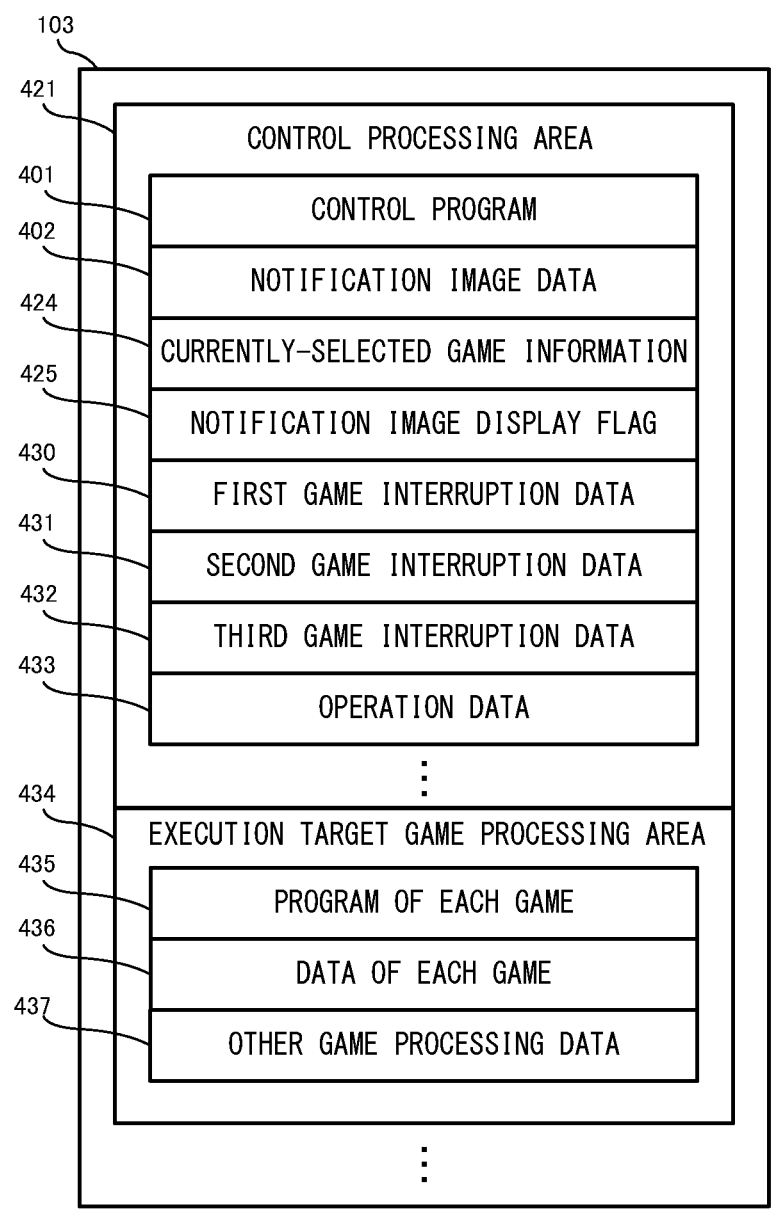
FIG. 15 illustrates a non-limiting example of data stored in a DRAM 103.

FIG. 15 illustrates a memory map showing an example of various kinds of data stored in the DRAM 103. In FIG. 15, the memory space of the DRAM 103 is divided into a control processing area 421 and an execution target game processing area 434. The control processing area 421 is mainly used for game switching control processing according to the exemplary embodiment, and the execution target game processing area 434 is used for executing game processing of the first game, the second game, and the third game.

First, in the control processing area 421, a control program 401, notification image data 402, currently-selected game information 424, a notification image display flag 425, first game interruption data 430, second game interruption data 431, third game interruption data 432, operation data 433, etc., are stored.

The control program 401 and the notification image data 402 are data copied from the flash memory 102. The currently-selected game information 424 is information indicating a game (hereinafter, referred to as an execution target game) currently selected as an execution target from among the first game, the second game, and the third game. A game screen of the game currently selected as an execution target is to be displayed on the display 104.

The notification image display flag 425 is a flag for indicating whether to display the notification image 260. When the notification image display flag 425 is ON, it is indicated that the notification image 260 is to be displayed. When the notification image display flag 425 is OFF, it is indicated that the notification image 260 is not to be displayed.

The first game interruption data 430 is data obtained by storing (saving) a game state when processing of the first game is interrupted with the first switching button 109. Similarly, the second game interruption data 431 is data obtained by storing a game state when processing of the second game is interrupted with the first switching button 109. The third game interruption data 432 is data obtained by storing a game state when processing of the third game is interrupted with the first switching button 109. In the following description, the first game interruption data 430, the second game interruption data 431, and the third game interruption data 432 are sometimes referred to simply as "game interruption data".

The operation data 433 is data indicating the content of an operation performed on the operation section 105. Specifically, the operation data 433 includes data indicating pressed states of various buttons described above.

Next, the execution target game processing area 434 will be described. In this area, the game program and the game data for the execution target game are copied from the flash memory 102. That is, any one of the first game program 403, the second game program 404, and the third game program 405 is read as a program 435 of each game in accordance with a switching operation or the like. Similarly, any one of the first game data 406, the second game data 407, and the third game data 408 is read as appropriate as data 436 of each game. In addition, various kinds of (temporary) data to be used in each game processing are generated as appropriate in the game processing, and stored as other game processing data 437.

[Details of Processing Executed by Processor 101]

Figure 16:
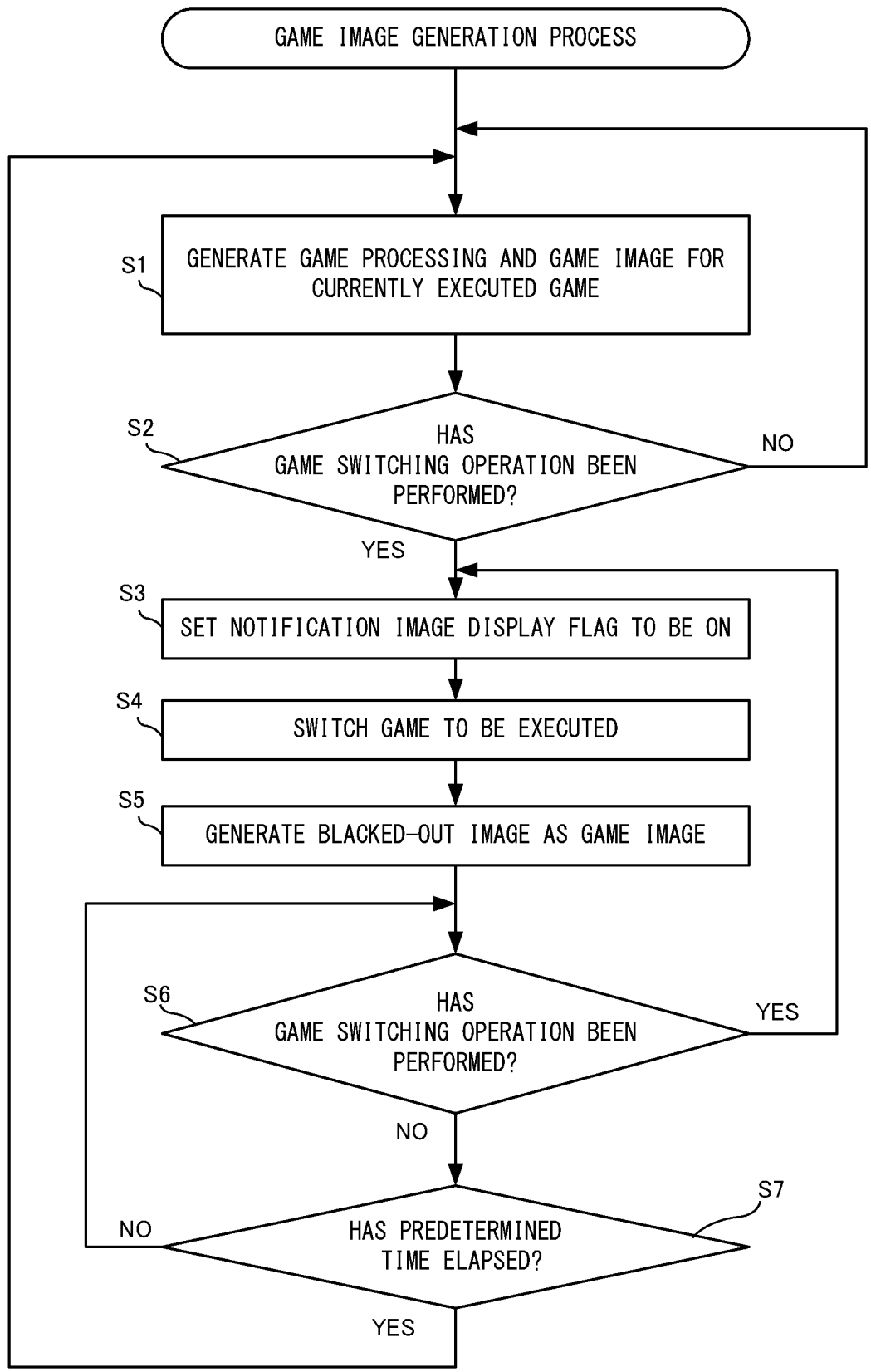
FIG. 16 is a flowchart showing a game image generation process in detail.

Next, the processing according to the exemplary embodiment will be described in detail with reference to flowcharts in FIG. 16 and FIG. 17. Here, processing for switching between the three games and display control of a notification image will be mainly described, and the detailed description of each game processing and the description of processing for the clock application are omitted.

Figure 17:
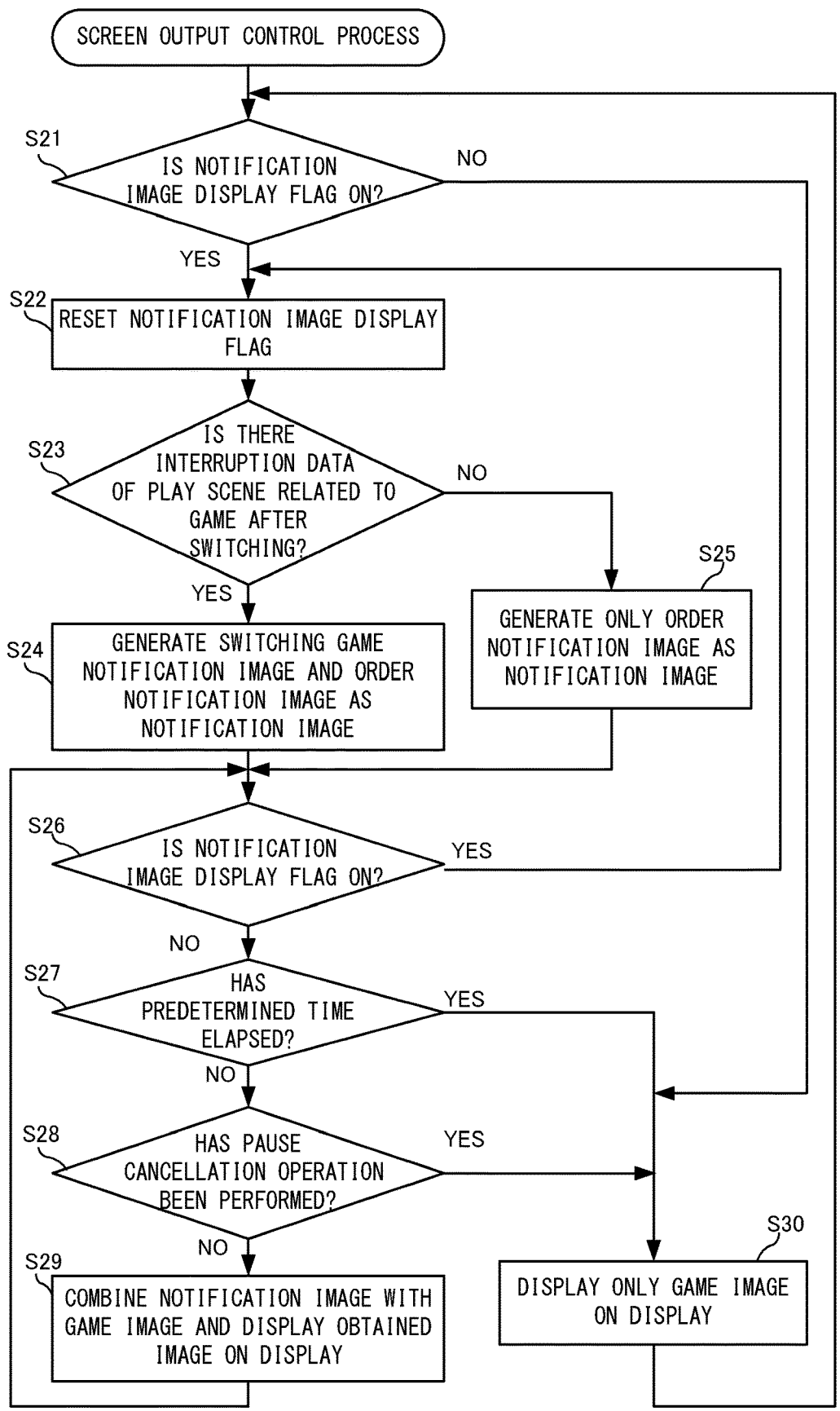
FIG. 17 is a flowchart showing a screen output control process in detail.

In the exemplary embodiment, an example in which a game image generation process shown in FIG. 16 and a screen output control process shown in FIG. 17 are executed in parallel while synchronizing with each other, will be described. In addition, for example, a process loop for each of these two processes is repeated every frame period. The game image generation process is mainly a process for generating a game image by performing game processing, and storing the game image in the VRAM which is not shown. The screen output control process is a process of outputting the game image stored in the VRAM in the above process, to the display 104, and combining the notification image 260 with the game image as necessary at this time, and outputting the game image.

First, the game image generation process will be described with reference to FIG. 16. Initially, in step S1, the processor 101 executes game processing of the currently executed game and generates a game image reflecting the result of the game processing. If game processing has not been started at this time, the processor 101 reads each data of the game to be executed, into the execution target game processing area 434, and starts game processing. As a result of the game processing, a game image is generated. The generated game image is stored in the VRAM.

Next, in step S2, the processor 101 determines whether the first switching button 109 has been pressed, that is, whether an operation for switching the game (hereinafter, a game switching operation) has been performed, on the basis of the operation data 433. As a result of the determination, if the game switching operation has not been performed (NO in step S2), the processor 101 returns to step S1 and continues the currently executed game processing.

On the other hand, if the game switching operation has been performed (YES in step S2), the processor 101 sets the notification image display flag 425 to be ON in step S3. Next, in step S4, the processor 101 executes a process for switching the game to be executed. Specifically, the processor 101 interrupts the currently executed game processing. At this time, if the game switching operation has been performed in the play scene, the processor 101 causes a paused state as described above, and then interrupts the game processing. Next, the processor 101 executes a process of storing the game state of the interrupted game processing. If the first game is interrupted, the processor 101 stores the other game processing data 437 at this time as the first game interruption data 430. Alternatively, the processor 101 may store the memory state of the entirety of the execution target game processing area 434 as the first game interruption data 430 as it is. If the first game interruption data 430 is yet to be generated at this time (the case of first saving, etc.), the first game interruption data 430 is generated at this time. Similarly, if the second game is interrupted, the processor 101 stores the game state at the time of interruption as the second game interruption data 431. If the third game is interrupted, the processor 101 stores the game state at the time of interruption as the third game interruption data 432. Then, the processor 101 determines the game to which switching is to be next performed, on the basis of the currently-selected game information 424. In this example, switching is performed in the order of first game→second game→third game as described above. Therefore, for example, if the content of the currently-selected game information 424 is the "first game", the processor 101 determines the "second game" as the game to which switching is to be next performed. Then, the processor 101 updates the currently-selected game information 424 with the result of the determination. Furthermore, the processor 101 reads the game interruption data of the game to which switching is to be performed, into the execution target game processing area 434. At this time, if the game has been interrupted in the title scene, the processor 101 updates the content of the execution target game processing area 434 such that the processing is performed from the beginning of the title scene.

The reason why the above paused state is caused in the case of the play scene is to improve the convenience of the user at the time of restart. In the case of interruption in the play scene, this interruption is in a state where the user is operating a player character, that is, interruption in the middle of operation. Thus, at the time of restart, it is made possible for the user to recall what circumstances the interruption occurred (for example, interruption occurred when trying to attack an enemy, etc.), and then restart the game, thereby helping the user smoothly return to the game.

Next, in step S5, the processor 101 generates a blacked-out image as described, as a game image, and stores the generated image in the VRAM.

Next, in step S6, the processor 101 determines whether the game switching operation has been performed, on the basis of the operation data 433. This is for determining whether the game switching operation has been performed while the blacked-out image is displayed. As a result of the determination, if the game switching operation has been performed (YES in step S6), the processor 101 returns to step S3 and repeats the process. If the game switching operation has not been performed (NO in step S6), the processor 101 determines subsequently in step S7 whether a predetermined time has elapsed from the start of the process of generating the blacked-out image. If the predetermined time has not elapsed (NO in step S7), the processor 101 returns to step S6 and repeats the process. On the other hand, as a result of the determination, if the predetermined time has elapsed (YES in step S7), the processor 101 returns to step S1 and repeats the process. As a result, the game processing of the game after switching is executed on the basis of the game interruption data. This is the end of the description of the game image generation process.

Next, the screen output control process will be described in detail with reference to FIG. 17. First, in step S21, the processor 101 determines whether the notification image display flag 425 is ON. As a result of the determination, if the notification image display flag 425 is not ON (NO in step S21), in step S30, the processor 101 outputs the game image (outputted to the VRAM) to the display 104 as it is. Then, the processor 101 returns to step S21 and repeats the process.

On the other hand, if the notification image display flag 425 is ON (YES in step S21), next, in step S22, the processor 101 resets the notification image display flag 425. Subsequently, in step S23, the processor 101 determines whether there is game interruption data, in the play scene, corresponding to the game after switching. As a result of the determination, if there is interruption data in the play scene (YES in step S23), in step S24, the processor 101 generates the notification image 260 including the switching game notification image 261 and the order notification image 262, using the notification image data 402. On the other hand, if there is no interruption data in the play scene (NO in step S23), in step S25, the processor 101 generates the notification image 260 including only the order notification image 262.

Next, in step S26, the processor 101 determines whether the notification image display flag 425 is ON. This assumes the case where the game switching operation is further performed while the notification image 260 is displayed. As a result of the determination, if the notification image display flag 425 is ON (YES in step S26), the processor 101 returns to step S22 and repeats the process. If the notification image display flag 425 is not ON (NO in step S26), the processor 101 determines subsequently in step S27 whether a predetermined time for displaying the notification image 260 has elapsed. As a result of the determination, if the predetermined time has elapsed (YES in step S27), the processor 101 advances the processing to step S30 described above. On the other hand, if the predetermined time has not elapsed (NO in step S27), the processor 101 determines subsequently in step S28 whether the pause cancellation operation has been performed, on the basis of the operation data 433. That is, the processor 101 determines whether the PAUSE button 111 has been pressed while the notification image 260 is displayed. As a result of the determination, if the pause cancellation operation has been performed (YES in step S28), the processor 101 advances the processing to step S30 described above. That is, the notification image 260 is deleted by performing the pause cancellation operation.

On the other hand, if the pause cancellation operation has not been performed (NO in step S28), in step S29, the processor 101 combines the notification image 260 generated in the above-described process, with the game image, and outputs the image obtained by the combination, to the display 104. Thereafter, the processor 101 returns to step S26 and repeats the process. This is the end of the description of the screen output control process.

This is the end of the detailed description of the processing according to the exemplary embodiment.

As described above, in the exemplary embodiment, the game can be easily switched by an operation of the first switching button 109. At this time, if the game to which switching is performed is a game interrupted during play, there is a possibility that the user cannot immediately grasp which game the switching is performed to, depending on the scene in the game, and cannot smoothly return to the game. For example, in the case of "a series of games" such as the first game and the second game, there is a high possibility that the design and stage configuration are similar in both games, so that it may be difficult to instantly grasp which of the games switching has been performed to. Therefore, in the exemplary embodiment, displaying the notification image 260 including the game title and the like can help the user return to the game. In addition, in the case where the title screen is displayed after switching, the user can grasp what game it is. In this case, the notification image 260 is not displayed. Accordingly, the visibility of the title screen can be improved, and effective use of the screen space can be made.

[Modifications]

In the above embodiment, in the case of interruption to restart in the play scene, the example in which the game is brought into a paused state and then restarted has been described. The exemplary embodiment is not limited thereto, and, in another exemplary embodiment, the following pattern may be used as a pattern of interruption to restart in the play scene. First, a pattern in which a paused state is not caused may be used. For example, when the first switching button 109 is pressed during play of the first game, switching is performed to the second game. Thereafter, when switching is performed to the first game, the first game is not restarted in a paused state, and the state during play in the play scene may be restarted as it is. In addition, in this case, the following pattern is also conceivable. A paused state is caused by the user pressing the PAUSE button 111 during play of the first game, and then switching is performed to the second game by the user pressing the first switching button 109. Thereafter, when the first game is restarted, the first game is restarted with the paused state being maintained. In addition, processing may be performed in the following pattern. A paused state is caused by the user pressing the PAUSE button 111 during play of the first game, and switching is performed to the second game by the user further pressing the first switching button 109. Thereafter, when the first game is restarted, the first game may be restarted in a state where the paused state is cancelled.

In the above example, the example in which the first game and the second game are a series of games in which player characters that are substantially the same are operated, has been described. In another exemplary embodiment, the first to third games may be games in which player characters are not substantially the same. Furthermore, in this case, some of the games may be, for example, games having similar overall atmospheres, such as having backgrounds or colors similar to each other. Alternatively, the some of the games may be, for example, puzzle games or simulation games with similar rules.

In the above example, the case where there are the "game programs" corresponding to the three game applications, respectively, has been described as an example. That is, the example in which there are a plurality of game programs has been described. The "plurality of game programs" also include a program in which a code corresponding to each game is included. That is, one program including codes corresponding to a plurality of games is included in the "plurality of game programs" in the exemplary embodiment.

In the above example, the case where the number of games to be switched is three has been described. However, in another exemplary embodiment, the number of games to be switched may be four or more.

In the above example, the example in which the clock application (non-game application) is switched using the second switching button 110 has been described. In another exemplary embodiment, the targets to be switched by the first switching button 109 may include the clock application. For example, switching may be able to be performed in the order of first game→second game→third game→clock application→first game.

In the above embodiment, the example in which the order notification image 262 is always displayed when game switching is performed, has been described. In another exemplary embodiment, if the game to which switching is to be performed is in the title scene, the order notification image 262 does not have to be displayed. Accordingly, the visibility of the title screen can be further improved.

In the above embodiment, the process of storing game interruption data when game processing is interrupted has been described as an example. In another exemplary embodiment, such game interruption data does not have to be used. For example, the execution target game processing area 434 may be individually prepared so as to correspond to each of the first to third games. The first to third games may be managed such that the first to third games are executed in parallel, one of these games is executed as a "foreground process" involving image output to the display 104, and the other two games are executed as a "background process" not involving output to the display 104. That is, switching may be performed between the foreground process and the background process by the game switching operation. In addition, when switching to the background process, if the current scene is the play scene, switching may be performed to the background process after a paused state is caused as described above.

In the above embodiment, the example in which the notification image 260 is displayed at the lower right part of the screen has been described as the display form of the notification image 260. The position at which the notification image 260 is displayed is not limited thereto, and, in another exemplary embodiment, the notification image 260 may be displayed at any one of the upper left, lower left, and upper right parts of the screen, or may be displayed at the center of the screen. As for the size of the notification image 260, in another exemplary embodiment, the notification image 260 may be displayed using the entire area of the screen (that is, on the entire screen), not at a part of the screen. In addition, in this case, for example, a representation in which the notification image 260 displayed on the entire screen is gradually made transparent such that the game image behind the notification image 260 becomes gradually visible, may be performed. In this case, since the notification image 260 is displayed using the entire area of the screen, the user can more easily recognize which game switching is to be performed. In addition, as for the contents displayed as the notification image 260 on the entire screen, for example, various kinds of information for allowing the user to grasp the situation at the time of interruption of game play such as the name of the stage when play is interrupted, and information indicating the progress of the stage during play, the position at the time of interruption, and how far the game has progressed, may be displayed in addition to the title of the game.

Regarding the subject that performs the above-described processing, a configuration other than the above configuration may be adopted. For example, in addition to the single game apparatus, the above-described processing is also applicable to a game system including a main body apparatus, an operation section, and a display section as separate components. Furthermore, a game apparatus may be configured to be able to communicate with a predetermined server, and main processes of the series of processes executed by the game apparatus 10 may be executed by a server-side apparatus, and some of the processes may be executed by the game apparatus 10.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A game apparatus comprising:
   a storage medium having stored therein game programs for a plurality of games each including at least a title scene in which a title screen is displayed and a play scene in which a play screen is displayed;
   a computer configured to execute game processing based on the game programs;
   a display on which a game screen related to the currently executed game processing is displayed; and
   a first input device configured to be operated by a user to thereby switch game processing to be executed among the plurality of games in a specified order, wherein
   when switching the currently executed game processing in accordance with an operation on the first input device:
   in a case where the currently executed game processing is in the play scene, the computer is configured to interrupt the game processing and perform switching to other game processing, and, when the game processing is executed again through a further operation on the first input device, the computer is configured to execute the game processing such that the game processing is restarted from a time of interruption of the play scene, and display a first image showing what game processing is being executed, on the display until a specified condition is satisfied, and in the case where the currently executed game processing is in the title scene, the computer is configured to perform switching to other game processing, and then when the game processing is executed again through a further operation on the first input device, the computer is configured to execute the game processing such that the game processing is restarted from the title scene without displaying the first image on the display.

2. The game apparatus according to claim 1, wherein a number of the game programs stored in the storage medium is at least three.

3. The game apparatus according to claim 1, wherein
a non-game application program is further stored in the storage medium,
the game apparatus further includes a second input device configured to be operated by the user to thereby switch between executing the game processing and executing non-game application processing based on the non-game application program, and
when switching is performed from executing the non-game application processing to executing the game processing in accordance with an operation on the second input device, the computer is configured to perform switching to executing the game processing executed immediately before switching to the non-game application processing.

4. The game apparatus according to claim 1, wherein at least two of the plurality of game programs stored in the storage medium are game programs in which player characters that are substantially the same are operated.

5. The game apparatus according to claim 1, wherein, when switching the currently executed game processing in accordance with an operation on the first input device, the computer is configured to display a second image showing which turn in the specified order the game processing, to which switching is performed, corresponds to, regardless of whether the currently executed game processing is in the play scene.

6. The game apparatus according to claim 5, wherein a display area of the second image is smaller than the display area of the first image.

7. The game apparatus according to claim 1, wherein, when restating the game processing interrupted during the play scene, the computer is configured to restart the game processing in a state where progress of the game is paused.

8. The game apparatus according to claim 1, wherein, when a specified time elapses after display of the first image is started, or when a specified operation is performed by the user even before the specified time elapses, the computer is configured to delete the first image.

9. The game apparatus according to claim 1, wherein
when switching the currently executed game processing in accordance with an operation on the first input device, the computer is configured to perform display such that a currently displayed game image is blacked out, for a specified time, and then start displaying a game image of a game to which switching is to be performed, and
when displaying the first image, the computer is configured to display the first image while the game image is displayed so as to be blacked out.

10. A non-transitory computer-readable storage medium having stored therein an information processing program executed by a computer of a game apparatus including a memory having stored therein game programs for a plurality of games each including at least a title scene in which a title screen is displayed and a play scene in which a play screen is displayed, and a display on which a game screen of a currently executed game is displayed, the information processing program causing the computer to provide execution comprising:

executing game processing based on the game programs;
switching game processing to be executed among the plurality of games in a specified order by a first input device being operated by a user; and
when switching the currently executed game processing in accordance with an operation on the first input device:
in the case where the currently executed game processing is in the play scene, interrupting the game processing and performing switching to other game processing, and, when the game processing is executed again through a further operation on the first input device, executing the game processing such that the game processing is restarted from a time of interruption of the play scene, and displaying a first image showing what game processing is being executed, on the display until a specified condition is satisfied, and
in the case where the currently executed game processing is in the title scene, performing switching to other game processing, and then when the game processing is executed again through a further operation on the first input device, executing the game processing such that the game processing is restarted from the title scene without displaying the first image on the display.

11. An information processing method executed by a computer of a game apparatus including a storage medium having stored therein game programs for a plurality of games each including at least a title scene in which a title screen is displayed and a play scene in which a play screen is displayed, and a display on which a game screen of a currently executed game is displayed, the information processing method comprising:

executing game processing based on the game programs;
switching game processing to be executed among the plurality of games in a specified order by a first input device being operated by a user; and
when switching the currently executed game processing in accordance with an operation on the first input device:
in the case where the currently executed game processing is in the play scene, interrupting the game processing and performing switching to other game processing, and, when the game processing is executed again through a further operation on the first input device, executing the game processing such that the game processing is restarted from a time of interruption of the play scene, and displaying a first image showing what game processing is being executed, on the display until a specified condition is satisfied, and
in the case where the currently executed game processing is in the title scene, performing switching to other game processing, and then when the game processing is executed again through a further operation on the first input device, executing the game processing such that the game processing is restarted from the title scene without displaying the first image on the display.

12. The game apparatus according to claim 1, wherein in the case where the currently executed game processing is in the title scene, a title screen demonstration is displayed in conjunction with the title scene.

13. The game apparatus according to claim 1, wherein in the case where the currently executed game processing is in the play scene, the computer is further configured to darken an image of the play scene, and display a notification image over the darkened image.

14. The game apparatus according to claim 13, wherein the notification image includes a switching game notification image and an order notification image.

15. The game apparatus according to claim 14, wherein the switching game notification image includes an iconized title image of a game to switch switching is to be performed.

16. The game apparatus according to claim 14, wherein the order notification image shows which of the plurality of games switching is to be performed.

\* \* \* \* \*